Apr. 24, 1923.  
S. W. SHUFORD  
WEIGHING MECHANISM  
Filed April 13, 1920  
1,452,763  
6 Sheets-Sheet 5

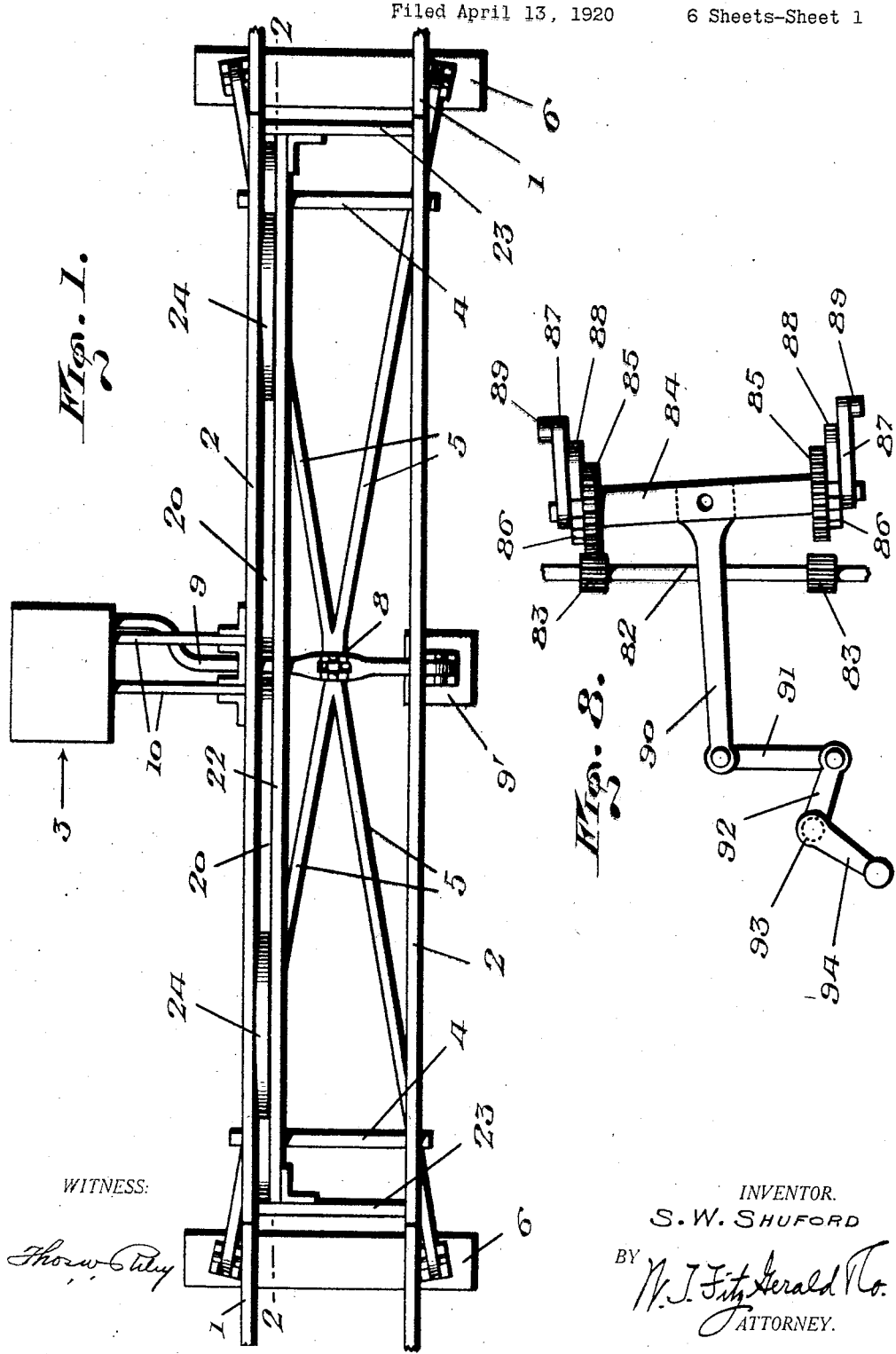

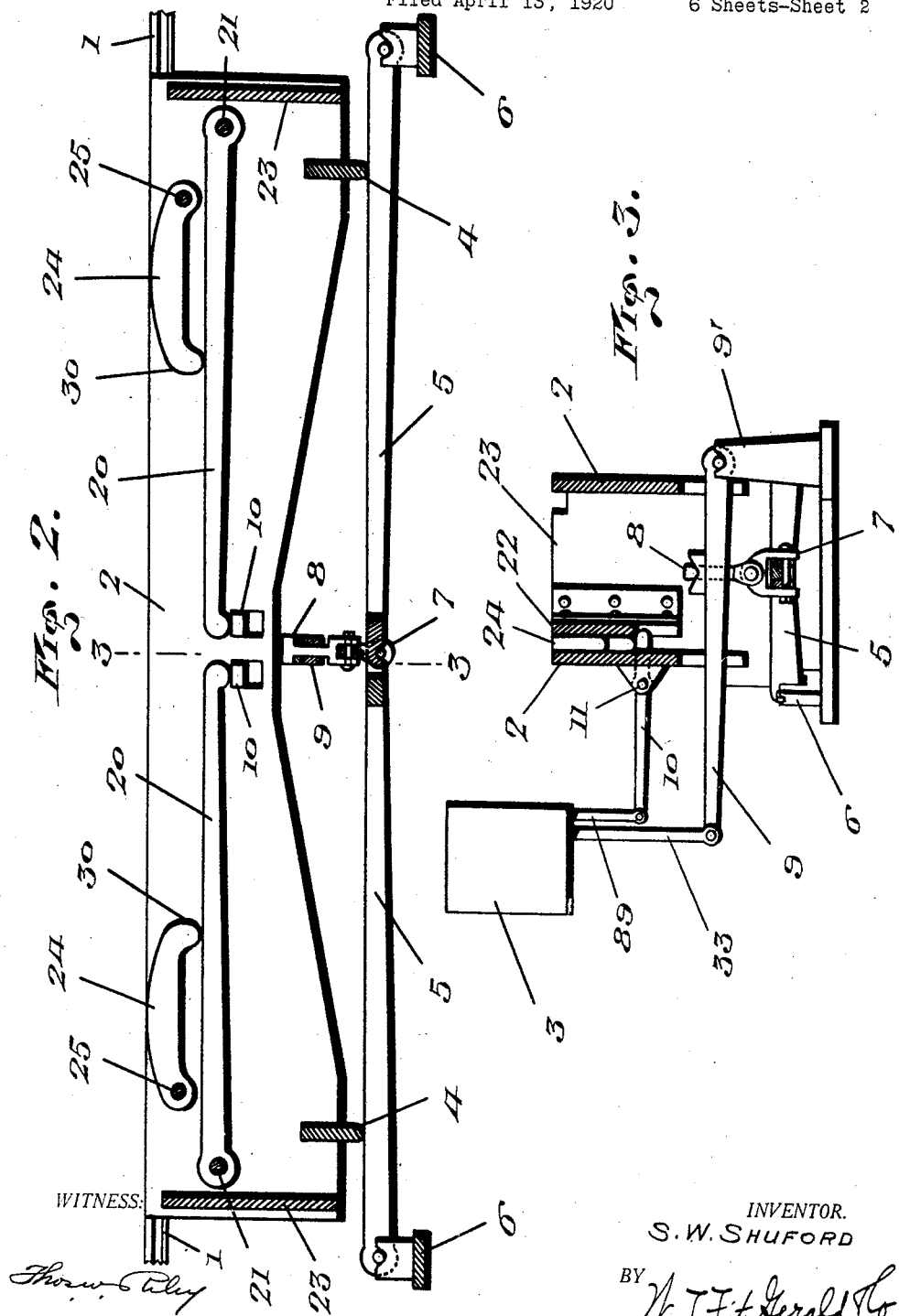

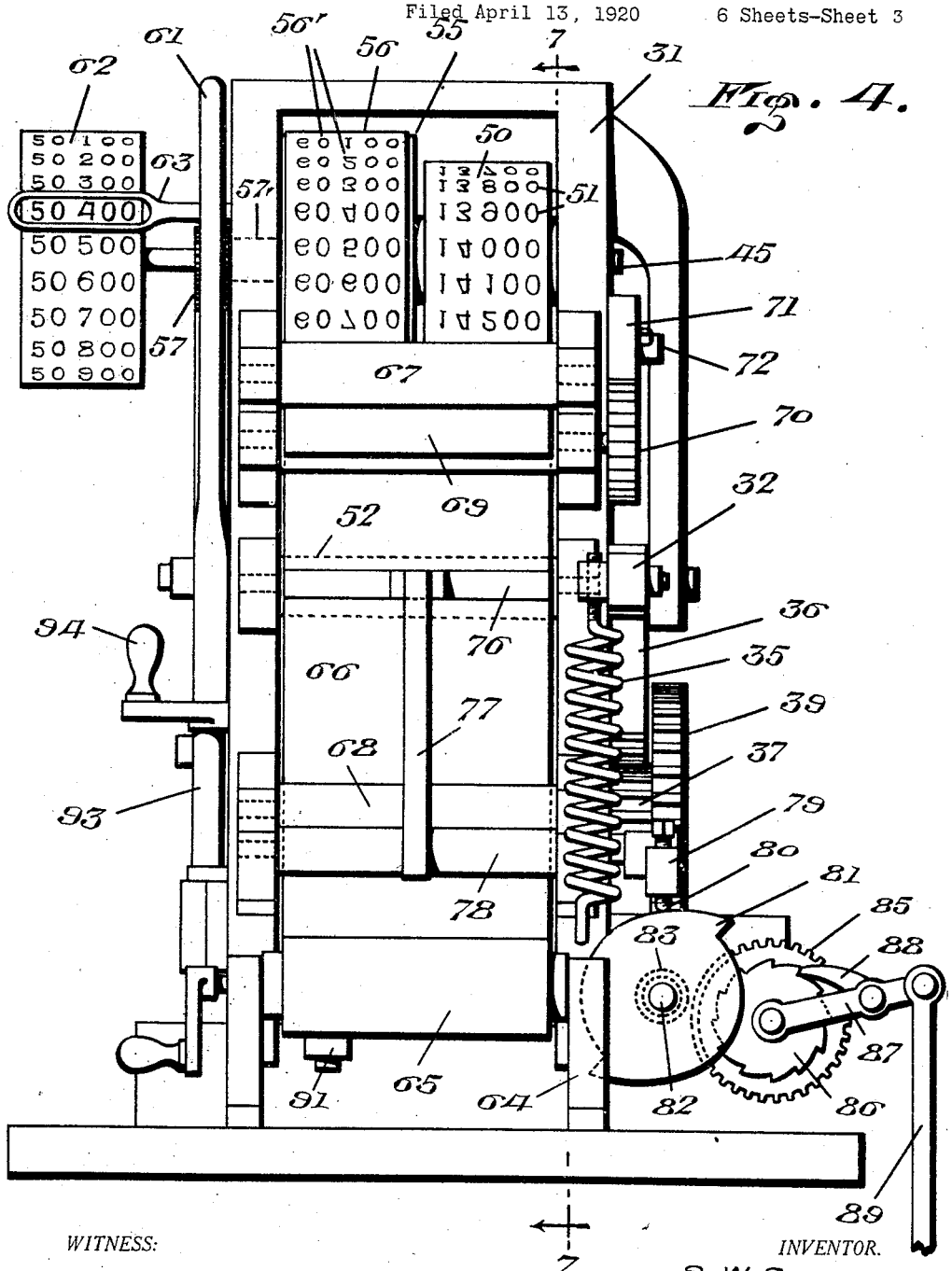

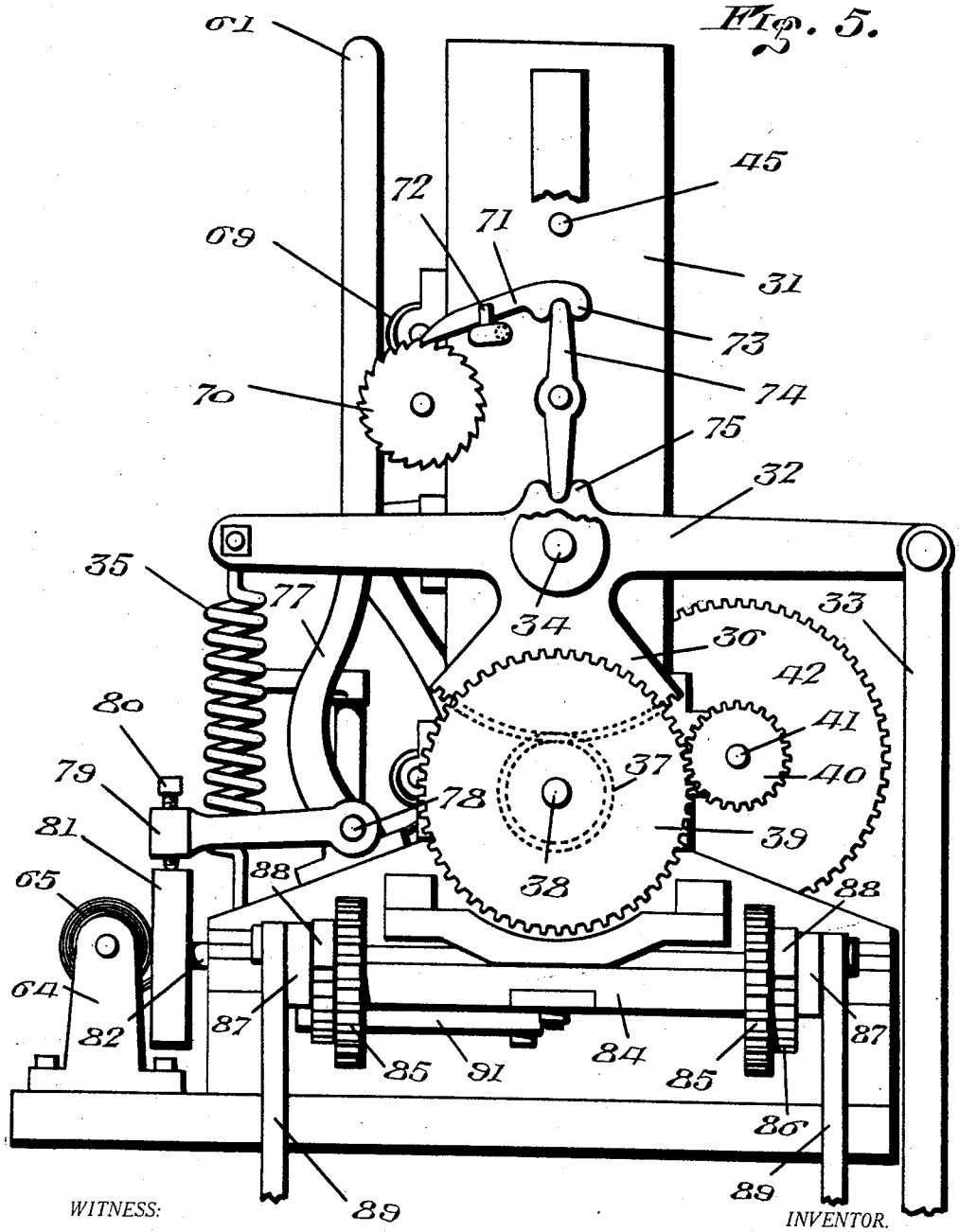

WITNESS:

INVENTOR.
S. W. SHUFORD
BY
ATTORNEY.

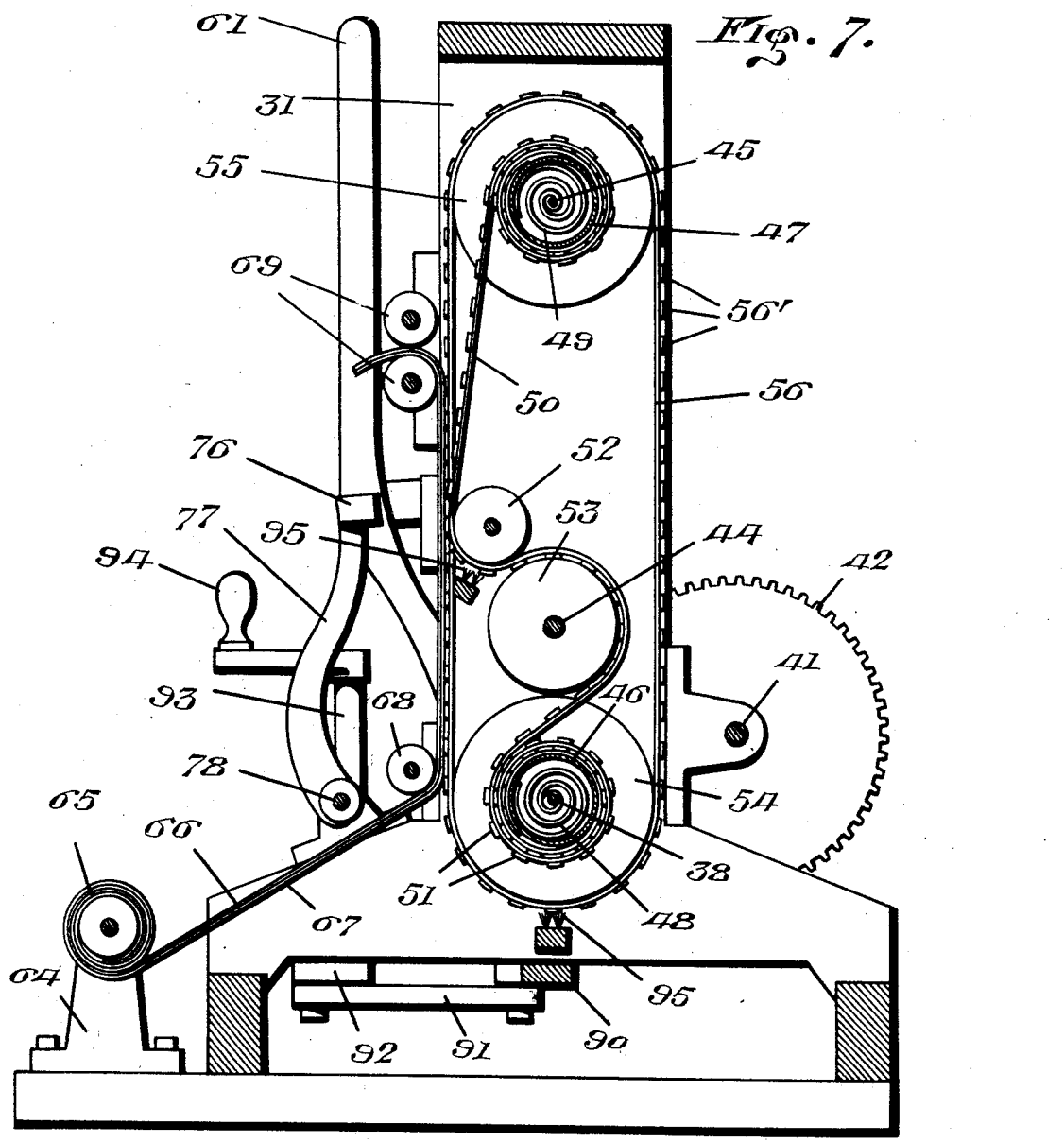

Patented Apr. 24, 1923.

1,452,763

UNITED STATES PATENT OFFICE.

STEPHEN W. SHUFORD, OF WOODLAWN, NORTH CAROLINA.

WEIGHING MECHANISM.

Application filed April 13, 1920. Serial No. 373,482.

*To all whom it may concern:*

Be it known that I, STEPHEN W. SHUFORD, a citizen of the United States, residing at Woodlawn, in the county of McDowell and State of North Carolina, have invented certain new and useful Improvements in Weighing Mechanism; and I do hereby declare the following to be a full, clear, and exact description of the invention, such as will enable others skilled in the art to which it appertains to make and use the same.

The present invention relates to scales and weighing mechanisms, and is particularly an improvement over the weighing mechanism disclosed in my copending application Serial No. 316,142, filed Aug. 8, 1919.

The invention has for its object the provision of a novel and improved apparatus for automatically weighing and recording the weights of successive objects passing over a part of the apparatus, such as a train of cars, and including novel mechanism for carrying out the intended functions.

A further object is the provision of a weighing and recording mechanism having means for printing or otherwise recording on a tape or other record sheet the weights of the successive cars of a train or other series of objects, thereby providing a permanent and accurate record of the gross weight of each car or object.

Another object is to provide in combination with the means for printing or recording the gross weights of the cars or objects, means for recording the weights of such cars or objects when empty, such car weights being disposed in association with the gross weights thereof, in order that the net weight can be readily determined, such car weight printing mechanism being controlled manually as the cars pass by.

A still further object is to provide novel means for actuating such printing or recording devices, and the tape or sheet on which the record is kept.

Another object is to provide means for preventing a false marking or record, and assuring of the proper registration and record as each of the successive cars or objects has moved onto the platform or support, thereby assuring of an accurate record of each of the series of cars or objects as they move over such platform, without false or unnecessary marking or record as the cars move onto and off of the platform.

Another object is to provide such safety means for the proper recording of the weights of the cars or objects which is operable for trains moving in either direction on a single track.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawings, wherein:—

Figure 1 is a plan view of the apparatus showing the recording means enclosed in a casing.

Fig. 2 is a longitudinal vertical section of the "platform" construction taken on the line 2—2 of Fig. 1.

Fig. 3 is a cross section on the line 3—3 of Fig. 2.

Fig. 4 is a front view of the recording device on an enlarged scale.

Fig. 5 is a side elevation of said device looking from one side.

Fig. 7 is a vertical section taken on the line 7—7 of Fig. 4.

Fig. 8 is a detail plan view of the means for alternating the connection of the tread members of the platform with the operating means of the recording device.

Figure 6:
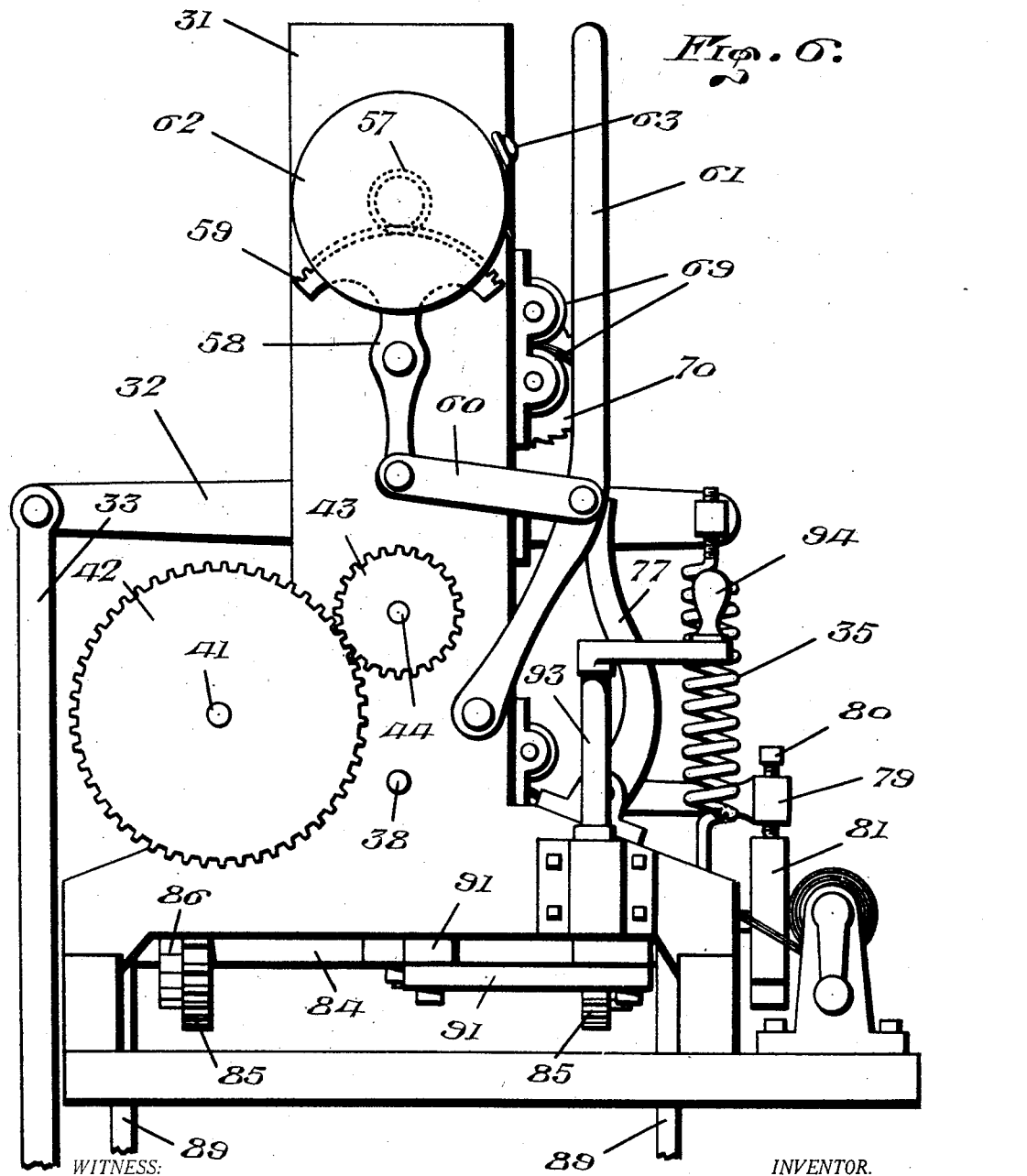
Fig. 6 is a side elevation looking from the opposite side.

The present apparatus, like that disclosed in said copending application, is being illustrated as being designed for railroad use, to weigh and record the weights of a train of cars passing over the "platform," although the apparatus can be provided with various platforms or yieldable supporting means over which various objects can be moved in succession to be weighed and their weights recorded.

The rails 1 of the track on which the apparatus is used, have interposed therein the rail sections or plates 2 alining with the rails 1 for the travel of cars over the "platform" of which the rail sections 2 constitute a part, said platform being of a length to accommodate one car. Disposed at one side of the track is a casing or housing 3 enclosing the recording device which is operated automatically as the cars move in succession over the platform, as will hereinafter more fully appear.

The vertical longitudinal plates or rail sections 2, the upper edges of which either form or support the rail sections, are mounted on transverse bearing members 4 near the ends of said plates, and said bearing members are seated on levers 5 that have their opposite ends fulcrumed on supports 6 at the opposite ends of the platform. The adjacent ends of the levers 5 pivotally engage a stirrup 7 that is suspended from a bearing member 8 seating on a transverse scale beam or lever 9 that has one end fulcrumed on a supporting block 9' at one side of the track, and said beam 9 projects toward the opposite side to the casing 3. The free ends of the levers 5 are thus supported by the yieldably supported beam or lever 9, and said levers 5 in turn support the platform yieldingly, so that when a car or other object moves onto and is supported by the platform, the levers 5 will be depressed proportionately to the weight of the car or object, thereby correspondingly depressing the beam 9. In this way, the beam 9 will control the recording device according to the weight of the object.

The railroad platform is equipped with means to bring the recording device into operation when the car is in a predetermined position on the platform, thereby preventing the recording device from making a false or premature record, and assuring of the proper positioning of the car on the platform before the record is made. For this purpose, a pair of transverse levers 10 are pivoted, as at 11, to one of the plates 2 and extend to a point near the casing. A longitudinal partition 22 is disposed adjacent to and parallel with said plate 2 and is secured at its ends to cross pieces 23 secured to the plates 2, and constituting therewith the frame of the platform. Arranged between the partition 22 and corresponding plate 2 are tread members or levers 24 located near the opposite ends of the platform and arranged to be depressed by the flanges of the car wheels, said tread members being located at the inner side of the upper edge or rail portion of the corresponding plate 2. These tread members 24 are pivoted, as at 25, to the partition 22 and corresponding plate 2, and have lugs 30 at their free ends seating on longitudinal levers 20 pivoted, as at 21, at their remote ends to the partition 22 and plate 2 and having their adjacent ends bearing on the short arms of the levers 10, so that the depression of the members 24 will depress the levers 20 to swing the outer long arms of the levers 10 upwardly, for making the record. Two of said members 24 are used, one for the movement of the train in one direction, and the other for the movement of the train in the opposite direction, as will hereinafter more fully appear.

Coming to the recording device enclosed within the casing, the working parts thereof are carried by a suitable frame 31, and a walking beam or lever 32 is connected at one end by a link 33 with the scale beam 9, said rocking beam 32 being fulcrumed, as at 34, to the frame 31 at one side thereof. A spring 35 connected to the opposite arm of the beam 32 serves to return said beam to initial position, thereby raising the platform after the load is removed therefrom. The beam 32 has a gear segment 36 meshing with a pinion 37 rotatable loosely on a transverse shaft 38 journaled within the frame 31, and a gear wheel 39 is rotatable with the pinion 37 and meshes with a pinion 40 secured on a transverse shaft 41. This gear train includes a gear wheel 42 secured on the shaft 41 at the opposite side of the frame, and meshing with a pinion 43 secured on the end of a transverse shaft 44 journaled in the frame above the shaft 38, whereby the rocking movement of the walking beam 32 will impart rotary movement in opposite directions to the shaft 44. This actuating gearing is used for operating or setting the means for printing or recording the gross weights of the cars, as will presently appear.

The printing or recording means for the gross weights of the cars includes a shaft 45 mounted in the frame above the shaft 44, and drums 46 and 47 mounted for rotation on the shafts 38 and 45, respectively, and connected by the spiral springs 48 and 49 with said shafts. A tape 50 is wound in opposite directions on the drums 46 and 47, and has provided on its front side a series of rubber or other suitable type 51 arranged in sequence and of numerals to correspond with the weights of the cars or objects. The tape 50 passes forwardly across a pressure roller 52, and is looped rearwardly around a feed or actuating roller 53 secured on the shaft 54. The spring 48 and 49 each tend to wind the tape on the corresponding drum, so that when the roller 53 is turned in one direction, the tape will be unwound from one drum by said roller, and will be wound on the other drum by its spring, and vice versa. Therefore, when the walking beam 32 is swung by the depression of the platform and scale beam 9, this will rotate the roller 53 to advance the tape 50, and it will be moved lengthwise a distance corresponding to the depression of the platform and weight of the object thereon, so that the corresponding numeral will be brought in front of the pressure roller 52, and when the spring 35 returns the walking beam 32, this will return the tape 50 to initial position. In this way, the printing or recording means for the gross weights of the cars is automatically set to the proper numeral presenting the gross weight of the car or object on the platform.

In addition to the means for printing or recording the gross weight of the cars, there is provided a manually-controlled means for printing or recording the car weights when empty, or "car weights" as distinguished from "gross weights," thereby enabling the net weights to be readily determined. For this purpose, rollers 54 and 55 are mounted loosely on the respective shafts 38 and 45 at one side of the drums 46 and 47, and an endless belt or tape 56 passes around said rollers 54 and 55 and is provided thereon with a series of type 56' running in sequence of graduated numerals to print the car weights when empty. The upper roller 55 has a hub 57' carrying a pinion 57 which meshes with a gear segment 59 of a lever 58 fulcrumed on the frame 31, and this lever 58 is connected by a link 60 with a hand lever 61 fulcrumed to the frame. Thus, the operator, by swinging the hand lever 61, can rotate the roller 55, for advancing or returning the belt 56 to bring the proper numeral in front of the pressure roller 52, across which the front run of the belt passes. To facilitate the positioning of the belt 56 for the proper record, according to the car weight, which is usually printed or painted on the car in bold numerals, an indicating wheel or drum 62 is rotatable with the pinion 57 and roller 55, and is provided with graduated numerals corresponding to those of type 56', and an index 63 serves to indicate the numeral which is in place in front of the pressure roller 52. The operator can therefore readily set the belt 56, by bringing the proper numeral within the index 63 as the cars move onto the platform.

The records are kept on a tape or strip of paper or other suitable material, and the frame 31 has brackets or posts 64 for supporting a roll 65 of paper, from which the tape or strip 66 extends, with a ribbon 67, containing ink, carbon or other printing material, extending along the face of the tape 66. The tape 66 and ribbon 67 extend upwardly past a guide roller 68 across the pressure roller 52 in front of the types 51 and 56' and then pass between a pair of feed rollers 69 which are actuated for feeding the tape 66 and ribbon 67 upwardly step by step. The actuating means of the feed rollers 69 includes a ratchet wheel 70 rotatable with one of said rollers, and operated by a pawl 71 slidable through a guide 72 which may be adjusted to regulate the amount of movement of the ratchet wheel 70 and tape 66. The pawl 71 has a notch 73 receiving one end of the lever 74 which is pivoted between its ends to the frame 71, and the other end of said lever engages in a notch 75 of the walking beam 32, whereby the rocking movement of said beam will swing the lever 74 to reciprocate the pawl 71, thereby advancing the ratchet wheel 70 step by step to advance the tape 66 and ribbon 67. The record tape and printing ribbon 67 are therefore advanced one step each time the walking beam 32 is oscillated, so that the weight records are printed on the tape in succession.

The record is made by a platen 76 carried by an arm 77 secured on a rock shaft 78, and said arm is swingable to bring the platen 76 against the tape 66 in front of the pressure roller 52, thereby pressing the tape and ribbon against the type which are in front of the roller, so that the numerals will be impressed on the tape by the ribbon 67. The platen 76 is operated by the tread members 24, and the operating mechanism includes an arm 79 secured to the shaft 78 and having an adjustable screw 80 bearing on a cam 81 secured on a shaft 82. This shaft 82 has a pair of pinions 83 thereon, and a rocking bar 84 pivoted between its ends to the frame 31 has mounted thereon a pair of gear wheels 85 adapted to alternately mesh with the pinions 83, when said bar is oscillated from one position to another, as will be understood by reference to Fig. 8. Each of the gear wheels 85 has a ratchet wheel 86, and arms 87 are carried for oscillation by the bar 84 and have pawls 88 engaging the corresponding ratchet wheels 86, and said arms are connected by links 89 with the corresponding recording levers 10 whereby one gear wheel 85 is advanced step by step by the depression of one tread member 24, while the other gear wheel is advanced similarly by the depression of the other tread member 24. The bar 84 has an arm 90 connected by a link 91 with an arm 92 of a vertical rock shaft 93 having a hand crank 94 which can be swung by the operator, for changing the bar 84 from one position to another. In one position of the bar 84, one tread member 24 is operatively connected with shaft 82, and in the other position of said bar, the other tread member is connected to said shaft. This mechanism is used for changing the control of the recording means from one tread member to the other according to the direction in which the train moves over the platform.

Brushes 95 can be provided for cleaning dirt or foreign matter from the type 51 and 56' as they are moved during the operation of the mechanism.

Before taking up the operation, it may be well to state that each of the tread members 24 is of a length so that each truck of the cars in passing thereover, will only depress said tread member 1 once, so that each tread member is depressed once for each truck of the cars, instead of said tread members being depressed once for each wheel that passes thereover.

The operation of the mechanism is as follows: Supposing that the train is moving from the right to the left as seen in Figs. 1 and 2, then the crank 94 is swung to bring the right hand gear wheel 85 in engagement with the corresponding pinion 83, as seen in Fig. 8. This will render the right hand tread member operable, while the left hand tread member 24 will simply operate idly, being disconnected from the recording device. Now, when the first truck of the first car passes over the right hand tread member 24, it is depressed once and then released, which will, by the movement of the corresponding levers 20 and 10, swing the corresponding arm 87 to turn the right hand gear wheel 85 one step, thereby rotating the shaft 82 through an angle, without bringing the cam 81 into operation. As shown, this cam is of double formation, so as to operate on the arm 79 twice for each revolution, and the shaft 82 is turned through one quarter of a revolution each time the shaft 82 is actuated by one of the tread members. Thus, during the first turning movement, the cam simply turns without swinging the arm 79, bringing the cam to a position to operate said arm during the next turning movement. Then, when the other truck of the car moves over the right hand tread member 24, so that the entire weight of the car is on the platform, said tread member in being depressed the second time will cause the cam 81 to turn another step, thereby raising the arm 79 and swinging the platen 76 into operation to make the impression. In the meantime, the weight of the car having been imposed on the platform before the tread member 24 is depressed the second time, the depression of the platform will have rotated the roller 53 to advance the tape 50 a distance corresponding to the weight of the car, to bring the proper numeral of the type 51 in front of the roller 52, and, as the car moves on the platform, the operator, by swinging the lever 61, sets the belt 56 to bring the proper type 56' in front of the roller 52 to indicate the weight of the corresponding car when empty. Therefore, when the platen 76 makes the impression the tape 66 receives a printed record containing not only the gross weight of the car, but also the empty weight thereof, so that the net weight can be readily determined by subtraction. Then, as the walking beam 32 returns by the action of the spring 35, the lever 74 is swung to advance the pawl 71, thereby advancing the ratchet wheel 70 one step, and feeding the tape 66 to bring a blank space in front of the pressure roller 52 for the next impression. When the first truck of the next car moves over the right hand tread member 24, the cam 81 is again turned through an idle arc, so that when the second truck moves over said tread member and the types having been set for the printed record, the next impression is made, the same as before. In this way, both the gross weights and car weights are recorded, side by side, providing a complete record of the train of cars.

When the train moves over the platform in the opposite direction, the bar 84 is reversed as to disconnect the right hand tread member 24 from the recording device, and to connect the left hand tread member therewith, so that the mechanism will operate the same as before, excepting the left hand tread member 24 now controls the recording operation, due to the movement of the cars on the platform in the opposite direction.

Having thus described the invention, what is claimed as new is:—

1. A weighing apparatus embodying a yieldable platform, a recording device operatively connected to the platform to be set by the depression thereof, tread members located at opposite ends of the platform, and means for alternately operatively connecting said members with said device for operating same to produce a record.

2. A weighing apparatus embodying a yieldable platform, a recording device operatively connected to the platform to be set by the depression thereof, means for bringing the recording device into operation to produce a record, tread members on the platform at opposite ends thereof, and an operative connection between the last named means and said members and operable for connecting either tread member with said means and disconnecting the other tread member.

3. A weighing apparatus embodying a yieldable platform, a recording device operatively connected to the platform to be set by the depression thereof, means for bringing the recording device into operation to make a record, tread members on the platform at the opposite ends thereof to be operated by cars moving over the platform, and an operative connection between the tread members and said means adapted to be set for the operation of said means by either tread member, in dependent of the other tread member, and arranged for operating said means during some movements of the corresponding tread member only.

In testimony whereof I have signed my name to this specification in the presence of two subscribing witnesses.

S. W. SHUFORD.

Witnesses:
W. B. BLACKWELL,
R. W. STEPHENS.